Figure 1:
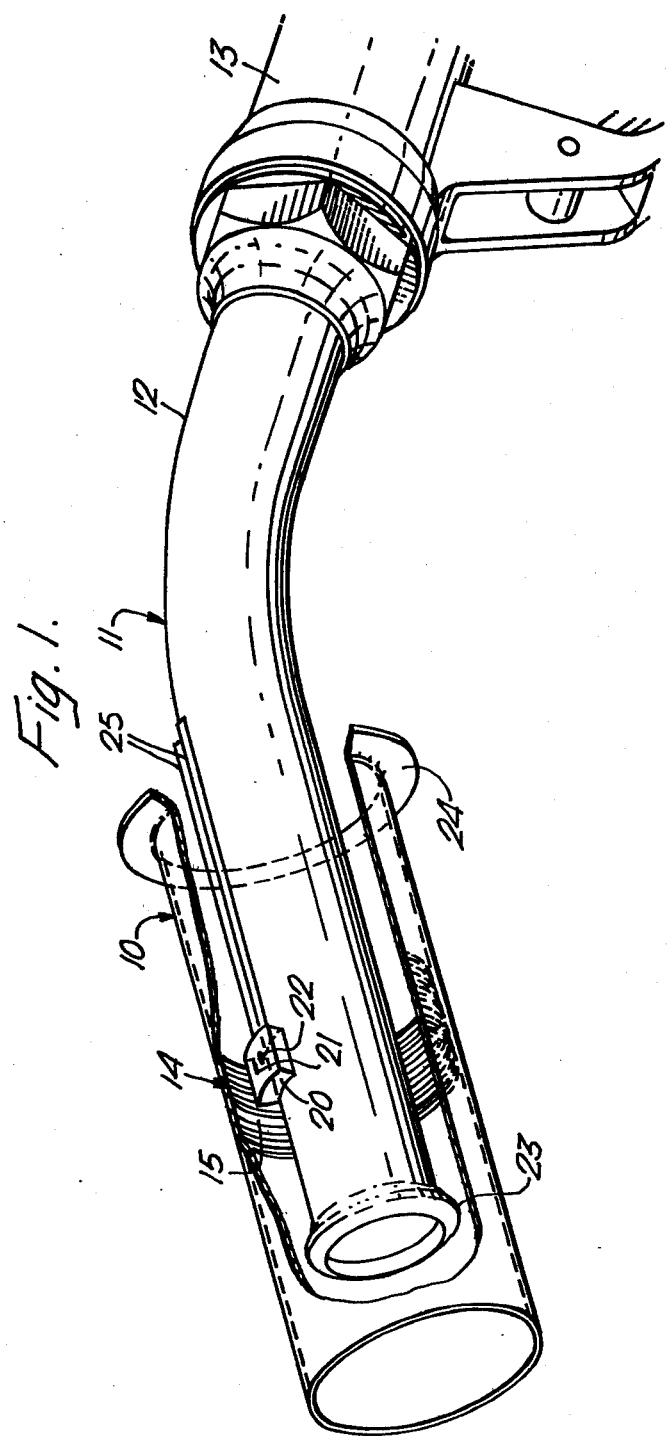

United States Patent [19]

Walkey et al.

[11] Patent Number: 4,469,149
[45] Date of Patent: Sep. 4, 1984

[54] MONITORED DELIVERY SYSTEMS

[75] Inventors: Laurence J. Walkey, Frome; Anthony J. Woolf, Amersham; George S. Ballard, Swaffham Bulbeck, all of England

[73] Assignee: Monitronix Systems Limited, Bath, England

[21] Appl. No.: 390,037

[22] Filed: Jun. 18, 1982

[30] Foreign Application Priority Data

Jun. 23, 1981 [GB] United Kingdom ............... 8119276

[51] Int. Cl.³ .............................................. B65B 3/04
[52] U.S. Cl. ...................................... 141/94; 141/98; 141/346; 141/351
[58] Field of Search ................... 141/98, 351, 198, 94, 141/95, 96, 346-350, 352-362, 192-197, 199-229; 290/271

[56] References Cited

U.S. PATENT DOCUMENTS 3,814,148 6/1974 Wostl ..................................... 141/98
3,815,784 6/1974 Hansel ................................... 141/351
4,109,686 8/1978 Phillips ................................. 141/98
4,169,521 10/1979 Vayda .................................... 141/98
4,263,945 4/1981 Van Ness ............................... 141/98

Primary Examiner—Houston S. Bell, Jr.
Attorney, Agent, or Firm—Scully, Scott, Murphy & Presser

[57] ABSTRACT

A liquid fuel pump nozzle (11) carries an optical bar code reader (20). A vehicle fuel reservoir has an entry port (10) provided with an optical bar decode strip (14) having bars (15) extending circumferentially of the port so that the bars are axially spaced. The reader thus reads the optical code during receiving movement of the nozzle into the entry port. The data reader and data provider may both be data transceivers. A comparator (44) compares data from the reader (20,40) with data from a data source (49), and optionally also with data from a credit card security system (56) to determine whether that vehicle is authorized to receive fuel, and an interlock (50) connected to the comparator to prevent fuel delivery in the absence of a signal from the comparator.

8 Claims, 3 Drawing Figures ns MONITORED DELIVERY SYSTEMS

This invention relates to systems for delivery of flowable material from a reservoir, for example liquid fuel from a pump into a vehicle fuel tank.

The delivery of fuel to vehicles, and the accounting or payment for the delivered fuel gives rise to substantial security problems. Retail sale of fuel to the public necessitates the handling of large amounts of cash. Credit sales are increasing, both against general bank credit cards and against more specific credit cards, e.g. for use only at one or more local garages. However credit sales necessitate reliable accounting and record procedures, and present their own security problems such as unauthorised or fraudulent use of the credit card.

The operators of transport fleets also have severe security and vehicle management problems. The supply of fuel from a fleet supply depot to unauthorised drivers or unauthorised vehicles or both is a constant problem and, apart from the substantial direct financial losses, can make it impossible to run a reliable vehicle servicing and maintenance management programme.

British Pat. No. 1,363,413 describes a delivery system, e.g. for petrol, wherein a user is provided with a credit card bearing coded data and is also given a personal code which is supposedly secret. To obtain petrol the user inserts the card in a card reader and manually enters the personal code on a keyboard. A comparator compares the two items of data and, if the items are related in a predetermined manner, releases an interlock to permit operation of the petrol pump. A recording device then prints out details of the credit card and the fuel delivery. Such systems have been installed for a number of transport fleet operators and retail petrol station operators.

The use of the above credit card system has solved some but not all of the security problems. In particular it remains possible for a person in possession of both the credit card and the personal code to supply unlimited amounts of fuel to unauthorised vehicles. That person can be the original possessor of the credit card using it in an unauthorised manner, or can be an unauthorised possessor of the card having obtained knowledge of the supposedly secret personal code from the original possessor, for example by careless use, talk, note-making or bribery. The printed records merely record the details of the card and fuel supplied, they cannot record the identity of the actual user of the card or of the vehicle.

According to the present invention there is provided a delivery system comprising a conduit for delivering flowable material from a reservoir, a tank having a tubular entry point adapted to receive a said conduit therein for delivery of material into said tank, data providing means associated with the circumference of said tubular entry port and arranged to provide data relating to that tank, and a data reader carried by said conduit and arranged to read data from a said data providing means upon reception of said conduit in a said entry port.

The data read by said data reader can be monitored as required in a particular installation. The data may be visually displayed and/or recorded in print and/or on magnetic tape. It can also be used on-line in a comparator to check the data against predetermined data in a source such as a memory. If verified, the comparator may then release an interlock to permit delivery to commence, or may actually initiate an otherwise enabled delivery device and/or may act to terminate delivery promptly in response to withdrawal of the conduit from the tank entry port. The latter feature would prevent an authorised tank filling operation to be immediately followed by an unauthorised tank filling from the same enabled pump.

The data providing means may be active or passive. A passive data provider may comprise, for example, an optical bar code strip. An active data provider may be a transmitter connected to a data source remote from the tank, e.g. on a vehicle dashboard, and in that case two-way data transmission may take place between the delivery device and the tank. A particular installation may use both the active and passive arrangements.

The invention may be used in combination with other security systems, for example the delivery system disclosed in British Pat. No. 1,363,413. That particular combination would then require the presence of an authorised credit card, a correct personal code, and an authorised vehicle before the fuel pump would be enabled. The authorisation of the vehicle may be specific to one card or to more than one card, and similarly the authorisation of the card may be specific to one vehicle or to more than one vehicle, as required. The state of authorisation is embodied in the data encoded respectively on the credit card and in the vehicle tank entry port.

Figure 2:
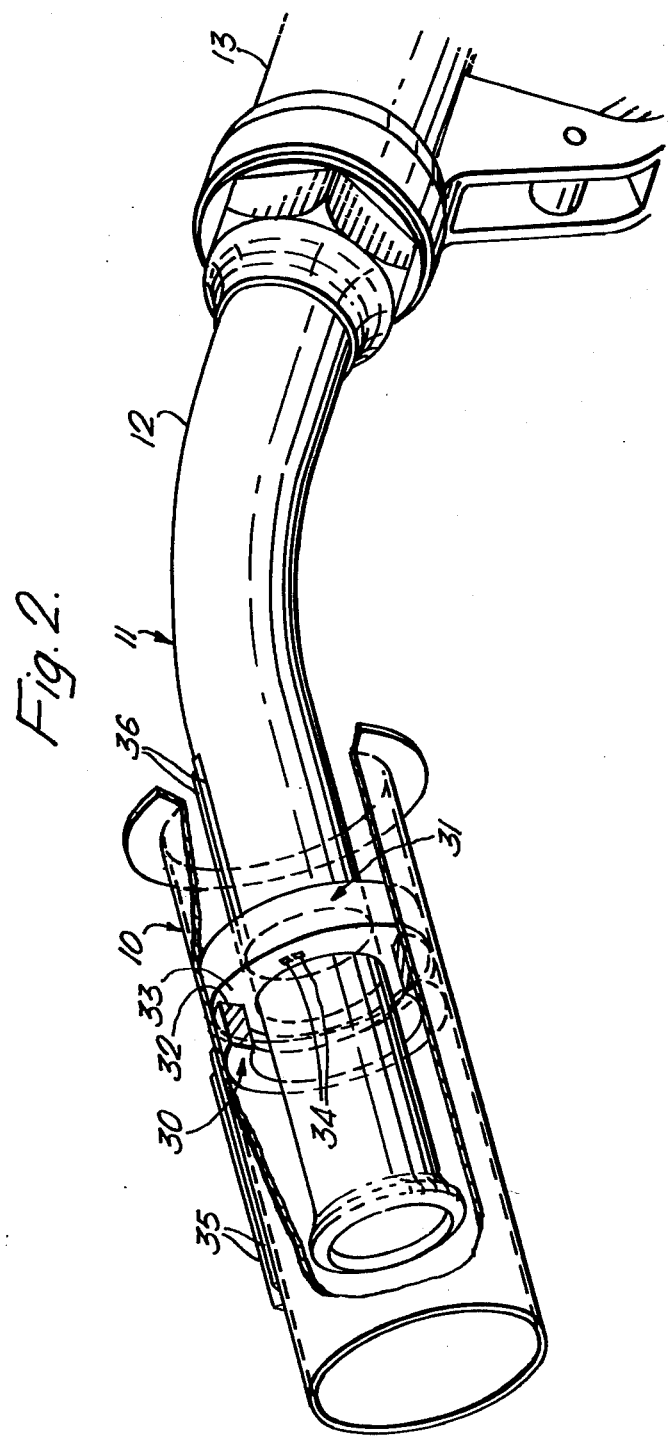
Figure 3:
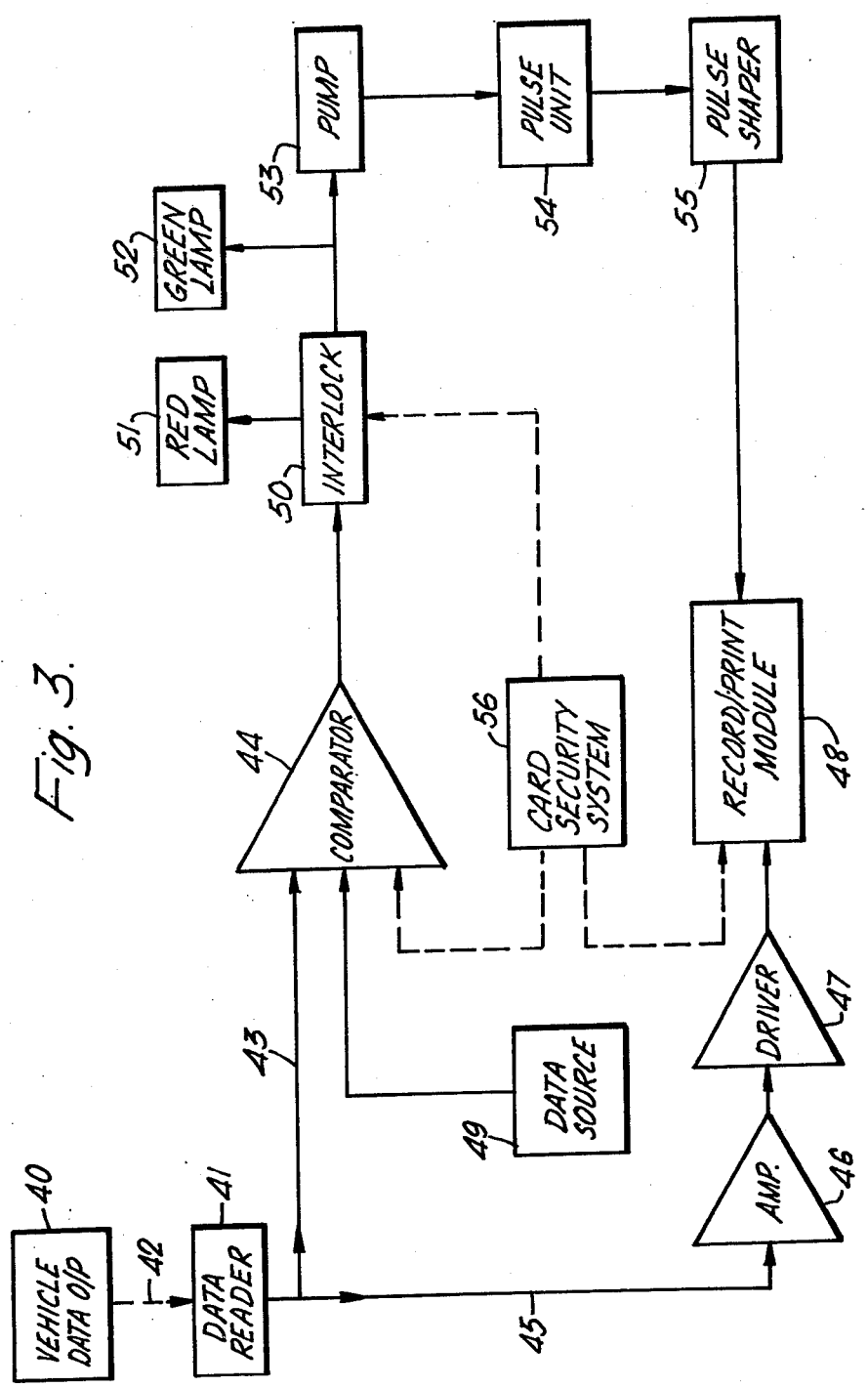

Embodiments of the invention will now be described, by way of example, with reference to the accompanying drawings, in which:

FIGS. 1 and 2 are each perspective views, partially cut away, of a fuel pump nozzle and vehicle fuel tank entry port carrying respectively a data reader and data provider for use in monitored delivery systems according to the invention; and FIG. 3 is a block circuit diagram of a monitored delivery system according to the invention.

Referring to FIG. 1 there is shown a tubular entry port 10 to a vehicle fuel tank, and a delivery conduit 11 in the form of the nozzle of a conventional liquid fuel supply line from a liquid fuel pump. The conduit is curved at 12 and provided with a hand grip 13. Passive data providing means in the form of an optical bar code strip 14 is provided within the port 10. Each bar 15 of the strip extends substantially wholly around the inner circumference of the port so that the bars are axially spaced. The strip may conveniently be of aluminium, the bars being back-filled in black and the spaces anodized, e.g. in yellow. The strip is located, e.g. by mechanical seating and petrol-resistant adhesive, well within the entry port and thus remains clean during use.

The conduit 11 carries a data reader in the form of an optical bar code reader 20 having a light-emitting diode 21 and a phototransistor 22. The diode 21 illuminates the successive axially spaced bars 15 during insertion of the conduit, and the phototransistor 22 receives the successive maxima and minima of reflected light from the respective illuminated spaces and bars, and provides an electrical signal representative of the read data. The reader is adapted to read the bar code at any speed of insertion within a speed window extending to, e.g., substantially one order of magnitude each side of a typical insertion speed of, e.g., about 10 centimeters per second.

The bar code can be read by the reader at substantially any relative angular orientation of the conduit about the entry port axis in view of the circumferential disposition of the bars 15. A join in the bar code strip should desirably be opposite the normal position of the reader because it is highly unlikely that a user would insert the typical fuel supply nozzle, with curve 12, in an upside-down orientation. The code can be reliably read within the usual range of spacing between the nozzle and the wall of the entry port. The reader is desirably located about halfway between the nozzle tip 23 and the entrance 24 to the port to reduce the range of variation in this spacing. The code is not read by the reader until the nozzle is well in the entry port to aid safety and reduce escape of fumes.

The reader is provided with output signal leads 25 extending along the outside of the nozzle and along the conventional flexible hose back to the fuel pump (not shown) and thence to a control unit to be described below. There are detailed safety specifications regarding electrical signals in the neighbourhood of inflammable fuel. The low voltage (e.g. 1½ volts) and low current signals from a phototransistor and to a light-emitting diode are fully acceptable in that context.

Referring to FIG. 2, similar features to FIG. 1 are identified by similar reference numerals. In this embodiment active data providing means in the form of an optical data transceiver 30 is provided within the entry port 10, and a similar optical data transceiver 31 is provided on the conduit 11. The transceivers are shown schematically in the form of annulii but would in practice be spoked or apertured structures to allow discharge of air from the tank as the fuel enters. The transceivers 30, 31 each comprise a plurality of similar pairs of light-emitting diodes and phototransistors, the pairs of one said transceiver being circumferentially spaced at a first spacing and the pairs of the other transceiver being circumferentially spaced at a second different spacing. That arrangement permits data transmission between at least one pair of each transceiver substantially at any relative angular orientation of the nozzle about the axis of the entry port. The pairs are potted into the annulii and exposed to face each other on opposed radial surfaces 32 and 33. One pair 34 on the surface 33 of transceiver 31 is shown by way of example.

In this embodiment the transceivers are adapted to convey data therebetween upon location of the conduit nozzle substantially at a predetermined axial position within the entry port. That location is defined by mutual axial engagement of the opposed radial surfaces 32 and 33.

The vehicle transceiver 30 is provided with input/output signal leads 35 extending to a remote data source and the fuel delivery nozzle transceiver 31 is similarly provided with input/output signal leads 36. Each pair on a transceiver is driven in parallel and read in parallel so that mutual data transmission can take place through any aligned pairs as described above.

In a modification (not shown) of the FIG. 2 embodiment, the vehicle transceiver annulus is disposed circumferentially around the outside of the entry port 10. The conduit nozzle transceiver annulus is disposed as in the FIG. 2 embodiment. The pairs of diodes/phototransistors are potted and exposed to face each other on opposed circumferential surfaces of the annulii, the vehicle transceiver pairs on the inner circumferential surface, and the nozzle transceiver pairs on the outer circumferential surface of the respective annulus. Windows, or a circumferential window are provided around the entry port to permit data transmission. The nozzle is located for data transmission by engagement of mutual stop means on the nozzle and vehicle, or by axial engagement of the nozzle transceiver with a stop means on the inner circumference of the entry port immediately downstream of the windows.

In each embodiment the read data can be monitored and/or used as required in a particular installation, as described above. FIG. 3 shows one such monitoring and control system. In FIG. 3, the vehicle data providing means is shown schematically at 40 and the nozzle data reader at 41. The optical communication therebetween is indicated by dashed line 42. The read data electrical signal is conducted by leads 43 to an input of a comparator 44 and by leads 45 through an amplifier 46 and driver 47 to a record module 48 which may include a printer and a magnetic tape recorder.

A source 49 of predetermined data is connected to a second input of comparator 44. The output of the comparator is connected to an interlock 50 provided with red and green lamps 51, 52 indicative of whether or not the interlock is released by the comparator output signal. The interlock is connected to enable and disable a fuel pump 53. Mechanically connected to the pump 53 is a pulse unit 54 which, for each predetermined unit of dispensed fuel, produces a pulse which, after shaping in a shaper 55, passes to the module 48. A card security system 56 may optionally be used in combination with the described arrangement and would typically have connections, shown by dashed lines, to the comparator 44, interlock 50 and module 48.

In operation the vehicle data read by the data reader 41 upon proper insertion of the nozzle 11 in the vehicle tank entry port 10 is compared in comparator 44 with predetermined data from the source 49. That predetermined data would typically be a list of the codes of all vehicles authorised to receive fuel from that particular fuel pump, or from that particular fuel supply depot or garage where one control/monitoring unit controls a number of pumps. The data source may be embodied as an EPROM device. If the comparator detects a predetermined relationship such as a coincidence between the vehicle code and a stored authorised code, it provides an output signal of predetermined character to release the interlock 50 and consequently to extinguish the red lamp and energize the green lamp.

Release of the interlock can simply enable the fuel pump 53 for subsequent manual release by conventional trigger grip. Preferably however, release of the interlock actually initiates automatic delivery of fuel from the pump. It will be recalled that the data reader 41 cannot send a valid signal to the comparator unless the pump nozzle is properly inserted within the tank entry port. Thus the interlock prevents fuel delivery in the absence of the signal of predetermined character from the comparator. Furthermore the interlock is preferably also adapted promptly to terminate fuel delivery, i.e. to disable the pump, in response to withdrawal of the fuel nozzle back from a data reading position of the data reader in the tank entry port. To assist this function the bar code may include a coded signal which is interpreted as a start signal, when validated by the comparator, upon entry of the fuel nozzle, and which is interpreted as a stop signal when read in reverse sequence upon withdrawing movement of the fuel nozzle from the tank entry port.

The record/print module is energized at the conclusion of fuelling, e.g. in response to a sustained absence of a pulse signal input, to print and/or magnetically record appropriate details such as the vehicle code, fuel quantity taken and other required items such as time and date, and fuel grade or type for example. The fuel grade requirement of the vehicle can if desired be included in the vehicle identification code to prevent refuelling with incorrect fuel. The described embodiment thereby renders it very difficult for a person to supply fuel to an unauthorised vehicle. Any master listing of the vehicle identification codes is kept under secure conditions at a separate location. If a vehicle is sold or stolen, the data source 49 at the or each pump control unit is readily changed to eliminate authorisation of that particular vehicle.

The preceding description applies to both the passive and active data providing embodiments of FIGS. 1 and 2 respectively. The FIG. 2 embodiment has further capabilities in that it permits two-way data communication between the vehicle and the garage or depot control unit during each authorised refuelling operation. Once vehicle identification and validation is achieved, the control unit may, for example, interrogate the vehicle through the two-way data link in the fuel tank entry port in respect to the fuel type of the vehicle, its milometer reading and tachograph readings for example. The module 48 can thus achieve a highly secure and hence highly reliable record of the fuel/distance achieved by that vehicle. Management can then compare the fuel consumption figures of the vehicles in a fleet and can take action by way of vehicle maintenance or driver questioning in the event of unusual record figures. Considerable improvements in fleet management are therefore possible as well as a reduction in the unauthorised supply of fuel.

As described above, the present security system may be used in combination with a card security system 56, for example of the type described in British Pat. No. 1,363,413. That combination would then require the presence of an authorised card, a correct personal code, and an authorised vehicle before the fuel pump would supply fuel. The comparator 44 may look for a predetermined coincidence between the vehicle code, the card code and the personal code, or a separate comparator may be used to compare the card and personal code, the card security system then sending a second enable signal directly to the interlock 50.

We claim:
1. A system for dispensing liquid fuel to vehicles, said system comprising:
   a fuel delivery conduit having a dispensing nozzle; an optical data reader carried by said dispensing nozzle;
   optical data providing means for mounting on a vehicle to provide data identifying that said vehicle;
   said vehicle provided with a fuel tank having a tubular entry port for reception of said dispensing nozzle during fuel dispensing, said tubular entry port having an inlet, a longitudinal axis and an inner circumferential surface;
   said optical data providing means comprising an optical bar code strip means disposed on said inner circumferential surface at a position spaced down from said inlet within said tubular entry port;
   said optical bar code strip means having optically readable bars embodying a vehicle identifying code, said optically readable bars lying on said inner circumferential surface and extending in the circumferential direction thereof generally perpendicular to said longitudinal axis of said tubular entry port;
   said optical data reader positioned on said dispensing nozzle to read said circumferentially extending optically readable bars upon longitudinal insertion movement of said dispensing nozzle into a safe fuel dispensing position within said tubular entry port, said circumferential extension of said optically readable bars permitting said reading at any relative angular orientation of the dispensing nozzle within a range about said longitudinal axis of said tubular entry port.

2. A vehicle fuel dispensing system according to claim 1 wherein each said optically readable bar of said optical bar code strip means extends substantially wholly around the inner circumferential surface of said tubular entry point.

3. A vehicle fuel dispensing system according to claim 1 including a source of predetermined vehicle identification data, said source listing the vehicles currently authorized to receive fuel from said fuel dispensing system;
   a comparator;
   means connecting said comparator to said source and to said optical data reader to compare the read data with the predetermined data;
   interlock means;
   means connecting said comparator to said interlock means to prevent commencement of fuel dispensing through said nozzle into any said vehicle fuel tank in the absence of a signal of predetermined character from the comparator, said signal of predetermined character indicating that said vehicle is authorized in said source listing;
   and said interlock means enabling commencement of said fuel dispensing in the presence of said signal of predetermined character.

4. A vehicle fuel dispensing system according to claim 3 wherein said interlock means is adapted to cause initiation of dispensing of fuel through an otherwise enabled said dispensing nozzle upon reception of a said signal of predetermined character.

5. A vehicle fuel dispensing system according to claim 4 wherein said interlock means is further adapted to cause termination of dispensing of fuel through said dispensing nozzle in response to longitudinal withdrawal movement of said dispensing nozzle back from said safe fuel dispensing position within said tubular entry port.

6. A system for dispensing liquid fuel to vehicles, said system comprising:
   a fuel delivery conduit having a dispensing nozzle;
   an optical data reader carried by said dispensing nozzle;
   optical data providing means for mounting on a vehicle to provide data identifying that said vehicle;
   said vehicle provided with a fuel tank having a tubular entry port for reception of said dispensing nozzle during fuel dispensing, said tubular entry port having an inlet, a longitudinal axis and an inner circumferential surface;
   said optical data providing means comprising an active optical data transmitter disposed on said inner circumferential surface at a position spaced down from said inlet within said tubular entry port;
   a source of vehicle identifying data disposed on said vehicle remote from said tank, and means connecting said source to said active optical data transmitter;

said active optical data transmitter extending circumferentially of said inner circumferential surface generally perpendicular to said longitudinal axis of said tubular entry port;

said optical data reader comprising an optical data receiver adapted to receive data optically transmitted by said active optical data transmitter;

said optical data reader positioned on and extending circumferentially of said dispensing nozzle to receive said optically transmitted data upon longitudinal insertion of said dispensing nozzle into a predetermined safe fuel dispensing position within said tubular entry port, said circumferentially extending disposition of both said active optical data transmitter and said optical data receiver permitting said data reception at any relative angular orientation of the dispensing nozzle within a range about said longitudinal axis of said tubular entry port.

7. A vehicle fuel dispensing system according to claim 6 wherein said predetermined safe fuel dispensing position of said dispensing nozzle within said tubular entry port is defined by mutual axial engagement of said optical data receiver with said active optical data transmitter.

8. A vehicle fuel dispensing system according to claim 6 wherein said active optical data transmitter and said optical data receiver are each constituted by active optical data transceivers permitting transmission of data in both senses between the vehicle and the dispensing system, each said transceiver comprising a plurality of similar pairs of light emitters and light receivers, the pairs of one said transceiver being circumferentially spaced at a first spacing, and the pairs of the other transceiver being circumferentially spaced at a second different spacing, whereby to permit data transmission between at least one pair of each transceiver substantially at any relative angular orientation of the dispensing nozzle about the longitudinal axis of said tubular entry port.

* * * * *